Patented Dec. 15, 1953

2,662,894

UNITED STATES PATENT OFFICE 2,662,894

1 - PHENYL - 2,3 - DIMETHYL-4-AMINO-5-PYRAZOLONE - N - PHOSPHORIC ACID DIALKYL-ESTERS

Emil Tonutti, Giessen, and Walter Schoeller, Konstanz, Germany, and Johann Jónás, Oakdale, N. Y.

No Drawing. Application October 2, 1950, Serial No. 188,076

Claims priority, application Germany October 5, 1949

5 Claims. (Cl. 260—310)

This invention relates to pyrazolone derivatives, and more particularly to a method of making dialkyl-esters of 1-phenyl-2,3-dimethyl-4-amino-5-pyrazolone-N-phosphoric acid, as well as the novel compounds thus obtained.

It has been recognized before that the antipyretic effect of 1-phenyl - 2,3 - dimethyl-4-amino-5-pyrazolone can be enhanced by alkylation.

It is an object of the present invention to provide pyrazolone derivatives having antipyretic properties materially surpassing even the improved products obtained by alkylation.

Other objects, and the manner in which the same are attained, will be apparent from the following description of the invention.

The invention contemplates to provide novel pyrazolone derivatives having heretofore unobtainable antipyretic properties, by converting 1-phenyl-2,3-dimethyl-4-amino-5-pyrazolone into the corresponding dialkyl-phosphoric acid ester derivatives, with formation of an NP bond.

The particular advantage for medical purposes of these compounds resides in that the detoxication is made possible by their ester characteristics which by way of saponification in the organism and formation of water soluble salts, facilitate the elimination. This is not possible with the N-dialkyl derivatives of antipyrin heretofore employed. These compounds are obtained in an advantageous manner, by the action of esters of mono-halo-phosphoric acid, accompanied by neutralisation of the hydrogen halide formed.

In order to fully describe the present invention, the following examples of the novel pyrazolone derivatives forming the subject matter of the present invention, and a method of making the same are stated below.

Example I 10.15 grams of 1-phenyl - 2,3 - dimethyl-4-amino-5-pyrazolone are reacted with 7.25 grams of dimethyl phosphoric acid ester chloride in the presence of a solution of 8.2 grams of sodium acetate and 2.8 grams of caustic potash in methanol. Once the reaction is completed, the pH of the reaction mixture is 7.0–7.2. The haloalkaline salt mixture formed, is removed and the solution concentrated. By inoculation, the 1-phenyl - 2,3-dimethyl - 4 - amino-5-pyrazolone-N-phosphoric acid dimethyl ester formed, crystallizes out. Purification is effected by means of recrystallization; the product crystallizes, for example, from an acetone-ether mixture in form of colorless crystals which after careful drying, have a melting point of 186–187°. The 1-phenyl - 2,3-dimethyl-4-amino-5-pyrazolone-N-phosphoric acid dimethyl ester thus obtained is soluble in water as well as in the customary organic solvents.

Example II 10.15 grams of 1-phenyl - 2,3 - dimethyl-4-amino-5-pyrazolone are reacted, in acetone solution, with 4.32 grams of diethyl phosphoric acid ester chloride. The 1 - phenyl-2,3-dimethyl-4-amino-5-pyrazolone hydrochloride crystallizes out and is separated by filtering. The concentrated mother liquor is inoculated to effect crystallization. The 1 - phenyl-2,3-dimethyl-4-amino-5-pyrazolone-N-phosphoric acid diethyl ester is thus obtained. The melting point of this diethyl ester was determined as 114–116°.

Example III 10.15 grams of 1-phenyl - 2,3 - dimethyl-4-amino-5-pyrazolone are reacted in acetone or preferably, in absolute benzene solution, with 5.012 grams of di-n-propyl-phosphoric acid ester chloride. The 1-phenyl-2,3-dimethyl-4-amino-5-pyrazolone hydrochloride precipitates quantitatively and is filtered off. From the mother liquor concentrated in vacuo the di-n-propylphosphoric acid ester of 1-phenyl-2,3-dimethyl-4-amino-5-pyrazolone crystallizes out. Its melting point was determined as 102–104°.

Example IV 10.15 grams of 1-phenyl - 2,3 - dimethyl-4-amino-5-pyrazolone are reacted in acetone or preferably, in absolute benzene solution, with 5.012 grams of di-iso-propyl-phosphoric acid ester chloride. The 1-phenyl-2,3-dimethyl-4-amino-5-pyrazolone hydrochloride precipitates quantitatively and is filtered off. From the mother liquor concentrated in vacuo the di-iso-propyl-phosphoric acid ester of 1-phenyl-2,3-dimethyl-4-amino-4-pyrazolone, having a melting point of 156°, crystallizes out.

Example V 10.15 grams of 1-phenyl - 2,3 - dimethyl-4-amino-5-pyrazolone are reacted in acetone, or preferably, in absolute benzene solution, with 5.712 grams of di-n-butyl-phosphoric acid ester chloride. The 1-phenyl-2,3-dimethyl-4-amino-5-pyrazolone hydrochloride precipitates quantitatively and is filtered off. From the mother liquor concentrated in vacuo the di-n-butyl-phosphoric acid ester of 1-phenyl-2,3-dimethyl- 4-amino-5-pyrazolone crystallizes out with a melting point of 105–107°.

Example VI 10.15 grams of 1-phenyl-2,3-dimethyl-4-amino-5-pyrazolone are reacted in acetone or preferably, in absolute benzene solution, with 5.712 grams of di-iso-butyl-phosphoric acid ester chloride. The 1-phenyl-2,3-dimethyl-4-amino-5-pyrazolone hydrochloride precipitates quantitatively and is filtered off. From the mother liquor concentrated in vacuo the di-iso-butyl-phosphoric acid ester of 1-phenyl-2,3-dimethyl-4-amino-5-pyrazolone, having a melting point of 113–116°, crystallizes out.

Example VII 10.15 grams of 1-phenyl-2,3-dimethyl-4-amino-5-pyrazolone are reacted in acetone or preferably, in absolute benzene solution, with 6.415 grams of di-iso-amyl-phosphoric acid ester chloride. The 1-phenyl-2,3-dimethyl-4-amino-5-pyrazolone hydrochloride precipitates quantitatively and is filtered off. From the mother liquor concentrated in vacuo the di-iso-amyl-phosphoric acid ester of 1-phenyl-2,3-dimethyl-4-amino-5-pyrazolone, having a melting point of 86–87°, crystallizes out.

Other lower dialkyl esters may be obtained in a manner corresponding to the procedure outlined in the examples.

The melting points stated above, are uncorrected.

The novel compounds obtained according to this invention have antipyretic characteristics materially surpassing even those of the improved 1-phenyl-2,3-dimethyl-4-amino-5-pyrazolone derivatives obtainable by alkylation.

We wish it to be understood that various modifications may be made within the scope of the appended claims, in the details of method and reagents set forth herein, without departing from the spirit of the invention or sacrificing any advantages thereof.

We claim:

1. As a new compound, a lower dialkyl ester of 1-phenyl-2,3-dimethyl-4-amino-5-pyrazolone-N-phosphoric acid corresponding to the general formula:

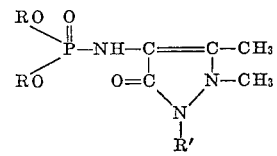

wherein R' is phenyl and R is lower alkyl.

2. A product according to claim 1, wherein R is methyl.

3. A product according to claim 1, wherein R is propyl.

4. A product according to claim 1, wherein R is butyl.

5. A product according to claim 1, wherein R is amyl.

EMIL TONUTTI.
WALTER SCHOELLER.
JOHANN JÓNÁS.

No references cited.